United States Patent [19]

Hafner

[11] 4,124,258
[45] Nov. 7, 1978

[54] BEARING RING FASTENING ASSEMBLY
[75] Inventor: Eugene R. Hafner, Carmel, Ind.
[73] Assignee: FMC Corporation, San Jose, Calif.
[21] Appl. No.: 839,100
[22] Filed: Oct. 3, 1977
[51] Int. Cl.² ............................................. F16C 33/30
[52] U.S. Cl. .................................... 308/236; 403/350
[58] Field of Search ............... 308/236, 216, 194, 189, 308/237 R, 207; 403/352, 374, 261, 351, 350

[56] References Cited
U.S. PATENT DOCUMENTS

| | | | |
|---|---|---|---|
| 3,007,753 | 11/1961 | Potter | 308/236 |
| 3,339,991 | 9/1967 | Howe, Jr. | 308/194 |
| 3,807,820 | 4/1974 | Schuhmann | 308/236 |
| 3,881,791 | 5/1975 | Hentschel | 308/237 R |
| 3,892,449 | 7/1975 | Baker | 308/236 |
| 3,938,901 | 2/1976 | Howe, Jr. | 308/236 X |

Primary Examiner—Trygve M. Blix
Assistant Examiner—Douglas C. Butler
Attorney, Agent, or Firm—J. W. Edwards; J. F. Verhoeven

[57] ABSTRACT

An inner ring of an anti-friction bearing has a central bore with a groove that extends radially outward and circumferentially about an axially intermediate portion of the bore. At the radially outermost portion of the groove is a bottom that is eccentric to the bore. A shaft is received within the bore and maintained centric with the ring. A longitudinally split locking sleeve having an eccentric external contour fits within the groove when the eccentric central axes of the groove bottom and the external sleeve contour are radially aligned with each other from the central axis of the bore. The sleeve has an unstressed bore diameter that is less than the shaft diameter to inherently grip the shaft when inserted therein. Relative rotation between the sleeve and the ring wedges the sleeve and inner ring into a locked position on the shaft. In a preferred embodiment, the ring has a radial hole therein intersecting one radial end of the groove, and at a radial end of the sleeve is a notch for alignment with the hole. Rotatably mounted within the ring hole is a pin that has a lug projecting eccentrically therefrom into the notch in the sleeve. The pin and lug can maintain the alignment of the sleeve relative to the ring, while a shaft is being inserted into the sleeve, and then rotate the sleeve relative to the ring to lock the ring and the sleeve upon the shaft.

6 Claims, 7 Drawing Figures

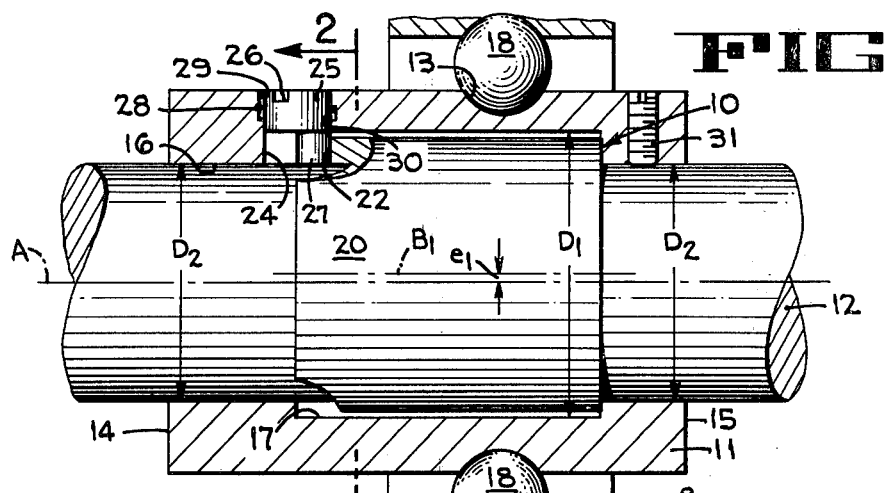
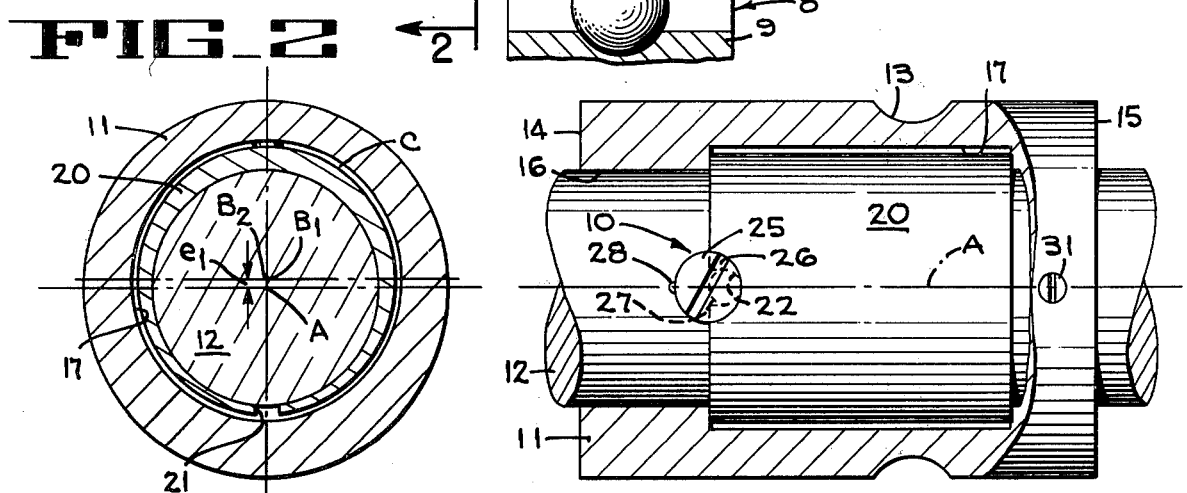
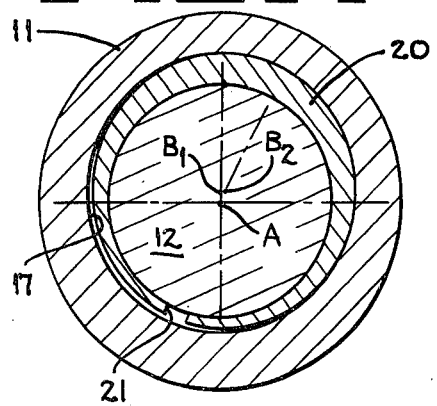
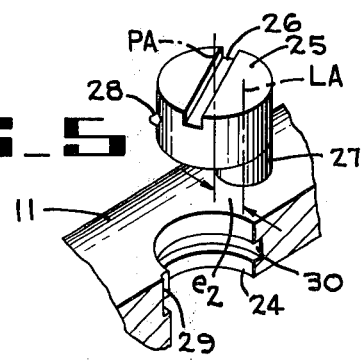
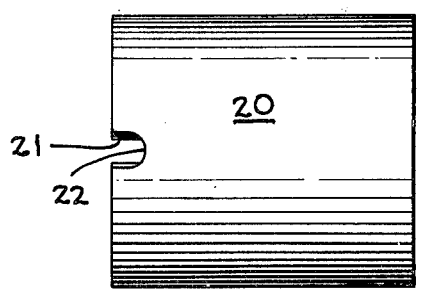
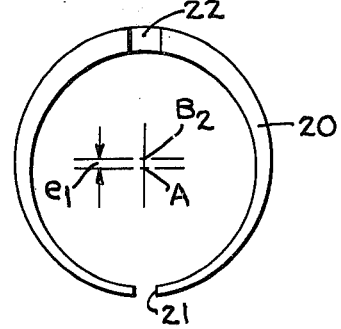

BEARING RING FASTENING ASSEMBLY

BACKGROUND OF THE INVENTION

1. Field of the Invention

This invention relates to an assembly for fastening an inner ring of an anti-friction bearing upon a shaft.

2. Description of the Prior Art

Eccentric cam locking collars have been used to fasten an inner ring of an anti-friction bearing to a rotatable shaft. Such collars have a tapered eccentric counterbored recess surface that engages a tapered eccentric extended surface at one end of the inner ring, and these surfaces function as mating cams. Rotation of the collar, relatively to the inner ring, causes a self-locking action, of the collar and inner ring, to the shaft. The locking force is distributed to the shaft, in a narrow band surrounding the shaft where the collar and ring overlap. The high pressure along the narrow band, about the shaft, often results in fretting corrosion problems. Such cam locking collars are shown in U.S. Pat. No. 1,650,573 that issued to Searles on Nov. 22, 1927; U.S. Pat. No. 1,821,877 that issued to Brown on Sept. 1, 1931; and U.S. Pat. No. 1,835,991 that issued to Runge on Dec. 8, 1931.

Locking collars can be eliminated by the use of eccentric cam sleeves or segments that fit within eccentric grooves in the bore portions of inner rings. Such sleeves and segments are shown in U.S. Pat. No. 2,038,121 that issued to Miller on Apr. 21, 1936; U.S. Pat. No. 2,100,725 of Styri that issued on Nov. 30, 1937; U.S. Pat. No. 3,007,753 that issued to Potter on Nov. 7, 1961; and U.S. Pat. No. 3,920,342 that issued to Warda on Nov. 18, 1975. Only the Potter patent suggests that the locking ring, carried by the shaft within the inner bearing ring, has a bore of lesser unstressed diameter than the shaft diameter to enable the ring to grip the shaft, and the ring shown in this patent is a continuous ring.

U.S. Pat. No. 2,228,282 that issued to Miller on Jan. 14, 1941, shows a tapered sleeve that is split longitudinally for locking a bearing ring upon a shaft. This patent discloses that if the sleeve bore is undersized with respect to the shaft, it is, of course, self-holding on the shaft. Since the sleeve is tapered, relative axial movement between the complemental tapered portions of the sleeve and the bearing ring is required for increasing frictional engagement, to bind the ring and sleeve upon the shaft. The sleeve does not fit in a groove that extends radially outward and circumferentially about an axially intermediate portion of the ring bore.

When a sleeve having an eccentric external contour is fitted into an eccentric groove that extends circumferentially about an axially intermediate portion of a ring bore, clearance and alignment problems are often encountered. It is desirable to minimize clearances between the shaft, the sleeve, and the ring, for reducing the relative rotation required to lock the sleeve upon the shaft. When such clearances are minimized, the eccentric central axes of the groove bottom and the external contour of the sleeve must be aligned radially with each other from the central axis of the ring bore, to enable the shaft to be slipped axially through the sleeve bore. The sleeve must be compressed radially to fit through the ring bore to the eccentric groove. Upon expansion of the sleeve to an unstressed condition within the groove, the sleeve should frictionally grip the shaft to prevent the shaft from turning within the sleeve bore. Slippage of the shaft within the sleeve bore would not provide relative rotation between the sleeve and the ring for tightening the sleeve upon the shaft.

SUMMARY OF THE INVENTION

A longitudinally split sleeve is made to frictionally grip a shaft by having an unstressed sleeve bore diameter that is less than the diameter of the shaft. The sleeve is resiliently flexible to receive the shaft and to allow the shaft to slide longitudinally within the sleeve bore. Such a sleeve has an eccentric external contour that fits within a groove extending circumferentially about an axially intermediate portion of a central bore within an inner ring of an anti-friction bearing. This groove has a bottom that is eccentric to the ring bore, and a central axis of the groove is eccentric to the central axis of the ring bore.

When the central axes of the groove bottom and the external sleeve contour are in radial alignment with each other and eccentrically located from the central axis of the bore, the shaft can be slipped axially through the ring and sleeve bores. Rotation of the sleeve relative to the ring moves the central axes of the external sleeve contour and groove bottom out of radial alignment with each other from the central axes of the ring and sleeve bores. Such relative rotation causes the sleeve to wedge within the groove between the ring and the shaft and thereby lock the ring upon the shaft.

To maintain alignment of the sleeve within the ring while the shaft is inserted therein and to rotate the sleeve relative to the ring for locking upon the shaft, the following structure is provided. The bearing inner ring has a radial hole therein intersecting one radial end of the groove. At a radial end of the sleeve is a notch for alignment with the hole in the ring. Rotatably mounted within the ring hole is a pin that has a lug protecting eccentrically therefrom in the sleeve notch. Rotation of the pin swings the lug to rotate the sleeve relative to the ring.

BRIEF DESCRIPTION OF THE DRAWING

FIG. 1 is a longitudinal section of a bearing ring fastening assembly embodying the present invention.

FIG. 2 is a transverse section taken on the line 2—2 of FIG. 1.

FIG. 3 is a plan view with portions broken away of the assembly shown in FIG. 1.

FIG. 4 is a section similar to FIG. 2, but with the sleeve rotated relative to the inner ring.

FIG. 5 is an exploded perspective view of a pin for aligning and rotating the sleeve and of a portion of the inner ring defining part of the hole in which the pin fits.

FIG. 6 is a plan view of a sleeve that fits within the assembly.

FIG. 7 is an end view of the sleeve shown in FIG. 5.

DESCRIPTION OF THE PREFERRED EMBODIMENT

Looking now at FIG. 1, an anti-friction bearing 8 has an outer ring 9, an inner ring 11, and a set of intermediate balls 18. While a ball type design of anti-friction bearing is shown, a roller type design of anti-friction bearing could also be used. The inner ring of the anti-friction bearing is fastened to a rotatable shaft 12 by an assembly 10. The inner ring has a generally cylindrical shape with a semi-circular ball race 13 extending transversely about the external surface of the ring. Radial end faces 14 and 15 are provided at opposite ends of the ring. A bore 16, having a central axis A, extends axially through the end faces and the ring. This bore is centrally located within the ring for receiving the shaft and maintaining the shaft centric with the ring. A groove 17 extends circumferentially about an axially intermediate portion of the bore, within the inner ring. This groove has a bottom that is defined radially about a central axis $B_1$ which is offset from the axis A by an eccentricity $e_1$. Thus, the groove bottom is eccentric to the ring bore. The groove bottom has a diameter $D_1$ that is greater than the bore diameter $D_2$ adjacent each end face.

With reference to FIG. 2, a locking sleeve 20 fits within the groove 17. This sleeve has an eccentric external contour extending radially about an axis $B_2$. Some clearance C is provided between the inner ring and the sleeve at a location within the groove, when the central axis $B_1$ of the groove and the central axis $B_2$ of the external sleeve contour are in radial alignment with each other and eccentrically located from the central axis A, as shown in FIG. 2. The clearance C has been exaggerated sufficiently to show in the drawing. The sleeve is split longitudinally to provide a gap 21 that enables the sleeve to be compressed radially for fitting through the ring bore. The sleeve has an unstressed bore diameter that is less than the diameter of the shaft 12. Since the sleeve is resilient, it will flex outwardly to receive the shaft and allow the shaft to slide longitudinally within the sleeve bore. Thus, the sleeve inherently grips the shaft. The central axes of both sleeve bore and the shaft correspond to the central axis A of the ring bore 16. A notch 22 is provided at one radial end of the sleeve, as shown in FIGS. 6 and 7.

With reference to FIGS. 1 and 5, the bearing inner ring 11 has a hole 24 that extends radially therein for housing a pin 25. The hole is located for intersecting one radial end of the groove 17. The pin diameter substantially corresponds to the diameter of the hole, while the pin length corresponds to the thickness of the inner ring at the maximum radial extent of the groove. A slot 26 is provided in the head of the pin for rotating the pin within the hole. A Phillip's head or hex key could be substituted for the slot in the pin head. A lug 27 projects downwardly from the pin on a lug axis LA that is offset from the pin axis PA by an eccentricity $e_2$. The lug diameter is about half the pin diameter, and the lug is mounted at one edge of the pin. The length of the lug corresponds to the thickness of the sleeve at the maximum radial extent of the sleeve, which is diametrically opposite from the gap 21. A protuberance 28, that extends radially outward from one side of the pin, slides vertically in a slot 29 at the edge of the hole 24. This protuberance rotates horizontally within a slot 30 that extends circumferentially about the hole and thereby keys the pin within the inner ring.

To mount the inner ring 11 upon the shaft 12, the sleeve 20 is radially compressed and inserted through the bore 16 to the eccentric groove 17. Within the groove, the sleeve expands radially to key itself therein against further axial movement in the bore. The sleeve is aligned so that the notch 22 is under the hole 24 in the inner ring. The pin 25 is inserted into the hole 24 after aligning the protuberance 28 with the vertical slot 29. The lug 27 fits within the sleeve notch to hold the sleeve in a position where the central axis $B_1$ of the eccentric groove bottom and the central axis $B_2$ of the sleeve external contour are in radial alignment with each other and eccentrically located from the central axis A of the bore 16. The shaft is then inserted through both the bore and the sleeve. Then the pin is rotated, and the lug 27 rotates the sleeve relatively to the inner ring. The sleeve wedges in place within the groove between the shaft and the inner ring.

The amount of rotation, of the pin 25, that is required to wedge the sleeve 20 in place between the shaft 12 and the inner ring 11 varies with the eccentric external contour of the sleeve and the eccentric groove 17, with the clearance C between the eccentric surfaces, with the diameter of the pin and the eccentricity of the lug, and with the size and shape of the notch 22. Preferably, these factors should be designed so that a quarter pin turn in either direction, from the position where the axes $B_1$ and $B_2$ are radially aligned from the central axis A, is sufficient for locking the inner ring upon the shaft. Then a quarter of a turn in the opposite direction unlocks the ring from the shaft.

A set screw 31 is provided in the inner ring at a location spaced from the eccentric groove 17. This set screw is radially aligned to contact the shaft 12. After the inner ring 11 has been locked upon the shaft, the set screw is tightened. Thus, the assembly 10 is maintained in a locked condition regardless of the direction of shaft rotation.

From the foregoing description, it will be seen that the bearing ring fastening assembly 10 has a longitudinally split sleeve 20 that fits within an eccentric groove 17 on an inner ring 11 and frictionally grips a shaft 12. A lug 27 positively holds the sleeve in a position, wherein the central axis $B_2$ of the eccentric sleeve external contour and the central axis $B_1$ of the eccentric groove bottom are in radial alignment from the bore central axis A, while the shaft is inserted through the sleeve bore 16. This lug projects downwardly from a pin 25, which can be turned to rotate the sleeve relatively to the eccentric groove bottom and the inner ring. Thus, the inner ring can be locked upon the shaft or unlocked therefrom.

Although the best mode contemplated for carrying out the present invention has been herein shown and described, it will be apparent that modification and variation may be made without departing from what is regarded to be the subject matter of the invention.

What is claimed is:

1. An assembly for fastening an inner ring of an antifriction bearing upon a shaft, said assembly comprising the bearing inner ring having a central bore for receiving the shaft and for maintaining the shaft centric with the ring, said ring having a groove that extends circumferentially about an axially intermediate portion of the bore, said groove having a bottom that is eccentric to the bore, a locking sleeve positioned within said groove, said locking sleeve having an eccentric external contour that fits within said groove when the central axes of the groove bottom and the external sleeve contour are in radial alignment with each other and eccentrically located from the central axis of the bore, said sleeve being split longitudinally to enable the sleeve to be compressed radially, said sleeve having an unstressed bore diameter that is less than the diameter of the shaft, said sleeve being resiliently flexible to receive the shaft and to allow the shaft to slide longitudinally within the sleeve bore, whereby said sleeve inherently grips the shaft, and upon relative rotation between the sleeve and the ring to move the central axes of the groove bottom and the sleeve external contour out of radial alignment with each other from the central axis of the bore, the sleeve wedges within the groove between the ring and the shaft to lock the ring on the shaft.

2. An assembly as described in claim 1 including a set screw mounted within said ring to contact said shaft when the assembly is locked and thereby maintain the assembly in a locked condition regardless of the direction of shaft rotation.

3. An assembly as described in claim 1 including means mounted within said ring for positively maintaining radial alignment of the central axes of the sleeve external contour and the groove bottom with respect to each other from the central axis of the bore while the shaft is being inserted through the ring and the sleeve.

4. A bearing locking assembly as described in claim 1 including means mounted within said ring for rotating the sleeve relatively to the ring to lock the ring on the shaft.

5. An assembly as described in claim 1 wherein said ring has therein a radial hole that intersects one radial end of the groove, said sleeve having a notch at a radial end thereof that is aligned with the hole in the ring, a pin rotatably mounted within the ring hole, and a lug that projects eccentrically from the pin into the notch in the sleeve, whereupon rotation of the pin swings the lug to rotate the sleeve relatively to the ring.

6. An assembly as described in claim 5 including means for retaining the pin within the ring hole.

* * * * *